Dec. 16, 1924.

L. SWEHLA 1,519,640

VALVE REGULATOR

Filed Nov. 23, 1921

Inventor
Louis Swehla

By
*J. L. Campbell*, Attorney

Patented Dec. 16, 1924.

1,519,640

UNITED STATES PATENT OFFICE.

LOUIS SWEHLA, OF MASON CITY, IOWA.

VALVE REGULATOR.

Application filed November 23, 1921. Serial No. 517,221.

*To all whom it may concern:*

Be it known that I, LOUIS SWEHLA, citizen of the United States, residing at Mason City, in the county of Cerro Gordo and State of Iowa, have invented certain new and useful Improvements in Valve Regulators, of which the following is a specification.

The present invention relates to internal combustion engines and particularly to means for regulating the valve movement thereof.

The main purpose and primary object of the invention is to provide means for making it possible to regulate and adjust the valves on an engine whereby the latter will operate efficiently at all speeds and with a greater economy in the consumption of fuel.

An additional object is to provide a valve regulating device in which the valves are operated by cams having at least three variations of movement for each valve and being adjustable longitudinally for varying the valve movement as required.

Various other objects and advantages of the invention will become apparent during the continuance of the following description.

In the drawings:—

Figure 1:
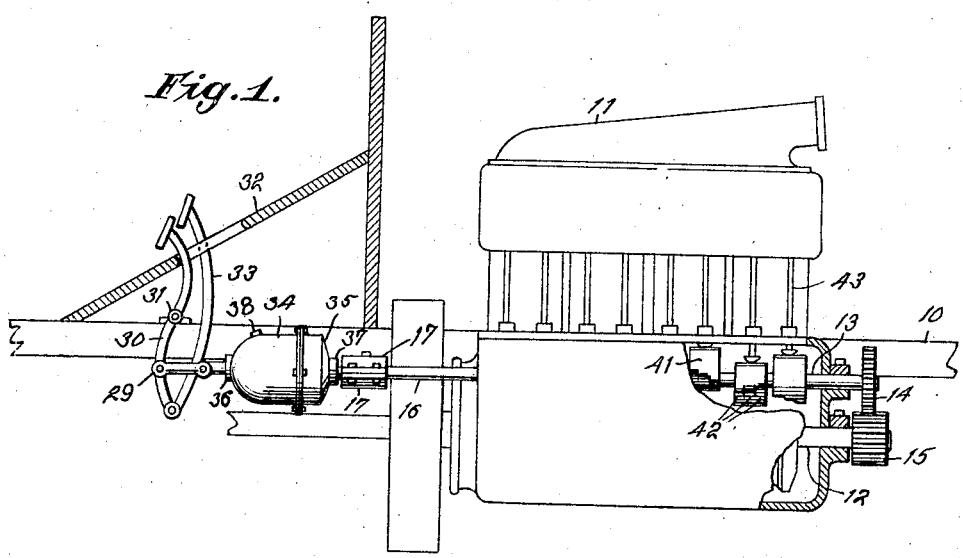
Figure 1 is a side elevation of an internal combustion engine, partly in section, and illustrating the manner of applying the invention thereto.
Figure 2:
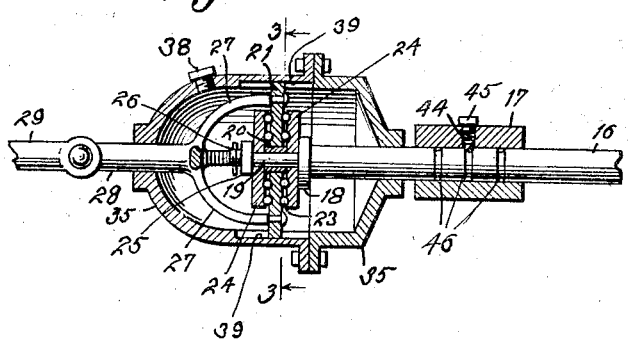
Figure 2 is a vertical longitudinal section through the bearing-slide of the device.
Figure 3:
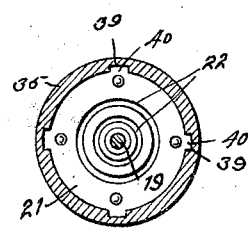
Figure 3 is vertical cross section taken on line 3—3 of Figure 2.
Figure 4:
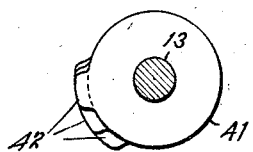
Figure 4 is an end view of one of the valve-operating cams.
Figure 5:
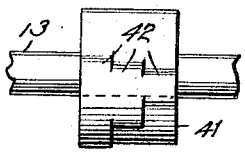
Figure 5 is a front view thereof.

In the drawings, 10 indicates a portion of an automobile chassis upon which is supported an internal combustion engine as indicated at 11. As may be seen in Figure 1, a portion of the crank case of the engine is broken away and discloses crank shaft 12 and cam shaft 13. These two shafts are relatively geared by intermeshing gears 14 and 15. The cam shaft is, therefore, driven from the crank shaft and, in the present instance, is slidably mounted in suitable bearings in the crank case so as to be adjustable longitudinally thereof. A projecting portion 16 of the cam shaft extends inwardly beyond the inner end of the crank case and is slidably supported in a bearing 17 carried by the chassis.

A collar 18 is formed at the terminal end of shaft portion 17 and has integral therewith a projecting stud 19 upon which is inserted a bushing 20. Centered upon the bushing is a large rotatable disc 21 having concentric grooves 22 on its opposite faces to provide ball races for ball bearings 23. Arranged on each side of the large disc are smaller discs 24 having their respective inner faces similarly grooved to provide ball races for the reception of bearings 23. The ball bearings permit the smaller discs to rotate independently of the central or large disc which is stationary as will be hereinafter explained.

One of the smaller discs it is to be noted is mounted on the stud of the cam shaft between collar 18 and bushing 19, the latter serving as a separator for the several discs whereby they are normally held spaced from one another to permit of independent movement without friction. The discs are held in place by means of lock nut 25 screwed on the end of the stud and prevented from backing off by means of a cotter pin 26.

Connected to disc 21 in any suitable manner are the arms 27 of a yoke member, the latter being provided with a shank 28 as shown. To one end of shank 28 is pivotally connected a link 29, the other end of the link being pivoted to a foot pedal 30 mounted to pivot in a bearing 31 on the chassis frame. At its upper end, pedal 30 projects upwardly through an opening in the foot board 32 of the dash frame of the vehicle body and has its lower end pivotally connected to the lower terminal of an auxiliary pedal 33, the upper end of which likewise projects through the foot board as shown.

These foot pedals are used for adjusting the cam shaft longitudinally of the crank casing and, as will be obvious, this adjustment is caused by merely depressing the pedal which causes a longitudinal shifting movement of the shaft.

Enclosing the cam shaft and yoke member at the joint is a casing 34 having a cover 35 bolted thereto. Suitable bearings 36 and 27 are provided in the cover and casing to support the cam shaft and crank of the yoke member. The case is adapted to contain lubricants which are placed therein through a suitable opening therein, which opening may be normally closed by a cap screw 38. In addition to providing a guard for the disc, the casing also serves as a guide and is provided upon its inner walls with longitudinally extending grooves 39 in which are received lug portions 40 of disc 21. These lugs prevent the rotation of the large disc although permitting sliding movement of the latter longitudinally of the casing. It will therefore be seen that the large disc provides a bearing for the stud end of the cam shaft and also a slide for shifting the shaft longitudinally when the pedals are operated.

In order that the opening and closing movement of the engine valve may be regulated in accordance with the speed of the engine, the cam shaft is provided with a plurality of valve-operating cams 41 having a circular body of suitable width and provided on the periphery of each cam is a series of stepped portions 42, consecutively varying in length and extending in arcs concentric to the circular body portion. As may be seen from Figure 1, these cams are so arranged on the cam shaft as to engage the valve lifters 43 for operating the valves as the cam shaft is rotated. The opening or closing movement of each valve will be varied to a greater or less extent as each step-portion of the operating cams is brought into operative engagement with the lifter element thereof. This engagement, of course, being effected by the longitudinal shifting of the cam shaft.

Since the adjustment of the cam shaft is under the control of the operator it is at once apparent that the movement of the valve may be regulated at will and varied to suit the operating speed of the engine by merely depressing one of the operating pedals. To check the longitudinal adjustment of the shaft and to indicate to the operator that one of the step portions of a cam is in active relation with a valve-lifter, a check in the nature of a spring thrust ball 44 is provided. This check operates in a suitable opening in bearing 17 and the tension of the spring may be regulated by adjusting screw 45. Cam shaft 16 is provided with a series of grooves 46 in which ball 44 operates, the said grooves being laterally spaced so that one will always come into engagement with the check ball whenever a step portion of one of the cams is engaged with a valve lifter. There are to be as many grooves as there are step portions on a cam, each groove representing a step portion. As the cam shaft is adjusted longitudinally of bearing 17, ball 44 is easily displaced from a groove under the superior pressure exerted on the operating pedal but the slight check given the adjusting movement when the ball becomes engaged with a groove passing the check opening is sufficient to indicate to the operator that the cams have been properly brought into operating position with respect to the valve lifter.

It will therefore be seen that the invention provides means for conveniently regulating the operation of the valves and for controlling same to correspond with the running speed of the engine.

From the foregoing it is believed that the advantages and novel features of the invention will be readily understood and therefore further detailed description is deemed unnecessary.

What is claimed is:—

A valve regulator for internal combustion engines including a slidable cam shaft, valve-actuated cams carried by said shaft, a guide casing into which the cam shaft extends, a large non-rotatable disc within the said casing and constrained to slide longitudinally, said disc providing a bearing for the end of the said cam shaft, smaller discs fixed on the cam shaft adjacent opposite faces of the large disc, bearings between the said opposed faces of the discs, a yoke carried by the said large disc, a lever for shifting the yoke to slide the said discs and the cams shaft longitudinally of the casing, and a connecting link between the said fixed lever and the said yoke.

In testimony whereof I affix my signature.

LOUIS SWEHLA.